United States Patent
Seefeldt et al.

(10) Patent No.: US 6,448,971 B1
(45) Date of Patent: Sep. 10, 2002

(54) AUDIO DRIVEN TEXTURE AND COLOR DEFORMATIONS OF COMPUTER GENERATED GRAPHICS

(75) Inventors: Alan Seefeldt; Alan Peevers, both of Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/491,530

(22) Filed: Jan. 26, 2000

(51) Int. Cl.$^7$ ............................................. G06T 15/00

(52) U.S. Cl. ....................................................... 345/475

(58) Field of Search ................................ 345/473, 474, 345/475; 707/103, 104

(56) References Cited

U.S. PATENT DOCUMENTS 6,064,393 A * 5/2000 Lengyel et al. ............. 345/473
6,208,360 B1 * 3/2001 Doi et al. .................... 345/475
6,304,264 B1 * 10/2001 Chen ........................... 345/473

* cited by examiner

*Primary Examiner*—Phu K. Nguyen
(74) *Attorney, Agent, or Firm*—Townsend and Townsend and Crew LLP

(57) ABSTRACT

A technique for changing the appearance of visual images mapped on a 3D object rendered by a computer includes the stepped of remapping texture coordinates to vertices of a 3D object at discrete time intervals and blending the remapped images. The control intervals are triggered by events in monitored signal such as an audio feed or a video stream. The images of the video stream can be the textures mapped to the 3D object.

9 Claims, 3 Drawing Sheets

AUDIO DRIVEN TEXTURE AND COLOR DEFORMATIONS OF COMPUTER GENERATED GRAPHICS

BACKGROUND OF THE INVENTION

The use of computers to play music has created a great interest in techniques of providing a visual accompaniment to the music, known as "eye candy". This interest has been accelerated by the internet and the availability of MP3 audio files which can be downloaded and played on MP3 players, such as WinAmp, Sonique, etc., which are also downloaded. Many of these players are configured to run plug-in visualization programs. Some of these players such as LAVA (Live Audio-Visual Animation), created by the assignee of the present invention, respond in real time to events based on characteristics of the music being played, e.g., transients (such as beats) or sounds in a selected frequency band (such as a high note played by flute).

Typically, the art in the scene consists of shapes and mapped textures which are stored in the memory of the computer. A visualization product disclosed in co-pending application Ser. No. 60/165,059, filed Nov. 12, 1999, entitled "Data Structure and Control Interface for an Event Driven Visual Presentation," which is hereby incorporated by reference for all purposes, describes a product allowing editing by a viewer to facilitate substitution of existing scene objects and textures with new objects and textures which may be downloaded from the internet.

A technique for deforming a texture mapped onto a computer generated 3D object based on triggering events detected in a video clip, which may be clip generated in real-time by a video camera, is disclosed in the commonly assigned application Ser. No. 60/165,097, filed Nov. 12, 1999, entitled "Automated Acquisition of Video Textures Acquired from a Digital Camera for Mapping to Audio-Driven Deformable Objects," which is hereby incorporated by reference for all purposes. Additionally, the scene mapped onto the 3D object can be a video stream, including the video stream which generates the triggering event.

Sophisticated image processing techniques exist which allow images to modified in interesting ways. Often these techniques require the input of many parameters making it tedious to explore the range of manipulations afforded by the techniques. Accordingly, improved techniques of manipulating graphics are required.

SUMMARY OF THE INVENTION

According to one aspect of the invention, a method for modifying a texture mapped onto a computer generated 3D object includes the acts of remapping texture coordinates to vertices of the object at discrete times during a control interval generated in response to an external triggering event. The image is interpolated across the polygons associated with vertices. By varying the image coordinates at each vertex interesting transformations of the image are achieved without the cost of modifying each individual pixel of the transformed image.

According to another aspect of the invention, the external triggering event is a change in a characteristic of an audio signal.

According another aspect of the invention, the color of each vertex is changed in response to detected triggering events.

According to another aspect of the invention, a translated or distorted mapped image can be restored by applying a default restoring mapping to the translated or distorted mapped image.

According to another aspect of the invention, remapped texture coordinates generated at different time intervals are blended to smoothly vary the appearance of the remapped images.

Other features and advantages of the invention will be apparent in view of the following detailed description and appended drawings.

DESCRIPTION OF THE SPECIFIC EMBODIMENTS

The preferred embodiments will now be described with reference to the drawings. In a preferred embodiment, images, such as bit maps or images in other formats, are mapped onto a 3D object displayed on a computer monitor. The mapped image is then translated and/or deformed by transformation functions triggered by events in an audio or visual signal.

Consider a set of vertices, each with an (x,y,z) coordinate that places the vertex somewhere in a virtual 3D environment on a computer. The vertices are connected with triangles, forming a surface of some sort in this 3D environment. Depending on the (x,y,z) coordinates of the vertices, the surface might form any number of shapes (a sphere, for example). In addition to the (xyz) coordinate, we also associate a surface coordinate with each vertex. This surface coordinate, denoted by (sx,sy), describes a position on the surface created by the set of connected triangles. In the case of a sphere, for example, an intuitive surface coordinate system is latitude and longitude. For simplicity of exposition we will consider a set of vertices organized in a 2-dimensional matrix, where the surface coordinate of any vertex is given by its row and column location.

Figure 1:
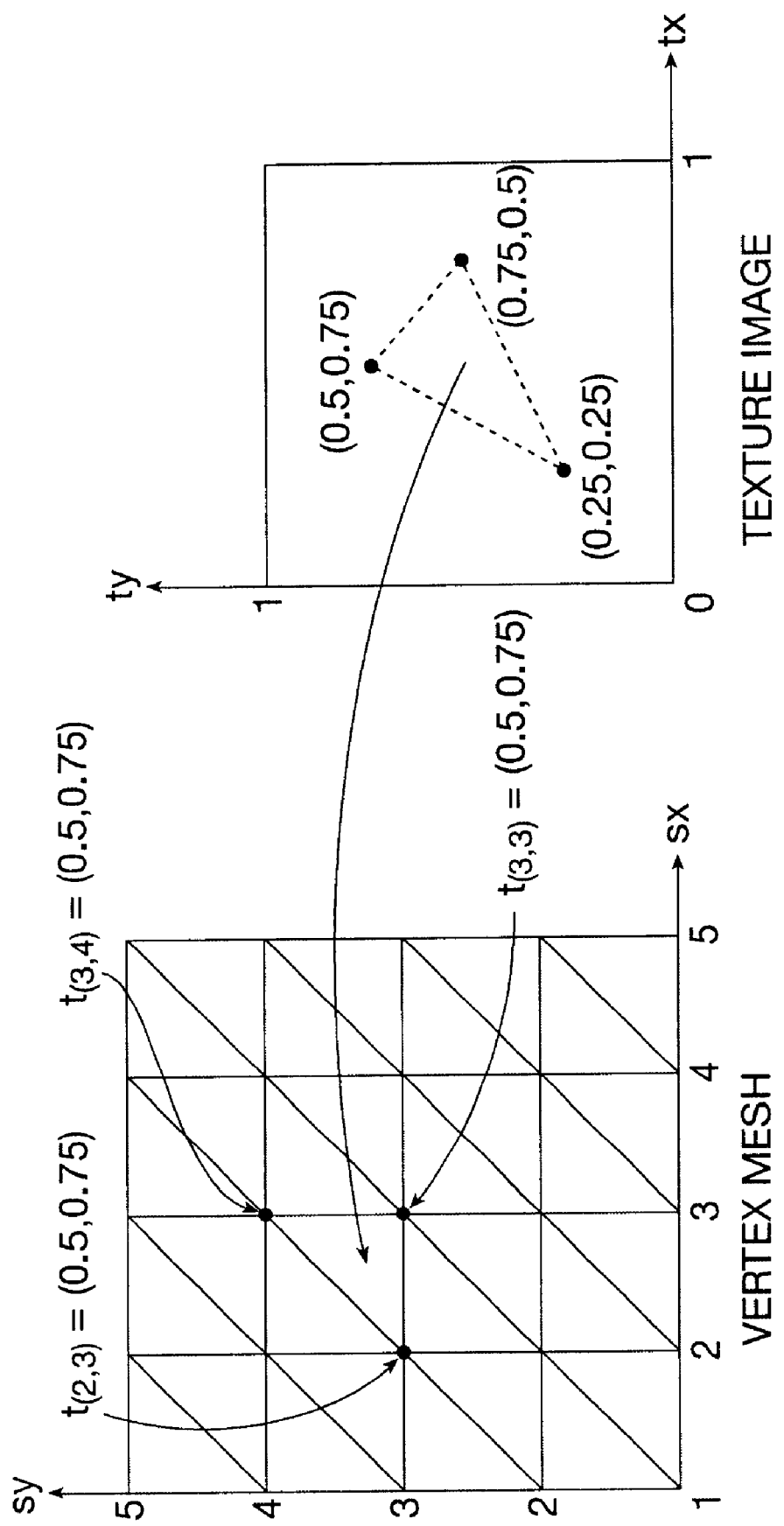
FIG. 1 is a pair of graphs illustrating the basics of texture mapping.

It is common practice in 3D computer graphics to map an image onto a surface, a process referred to as texture-mapping. The process involves assigning a texture coordinate to each vertex which describes a specific point on the image that is to be mapped onto the surface. With a texture coordinate assigned to every vertex, a triangular piece of the image is mapped onto every triangle of the surface. FIG. 1 depicts this process, where the vector notation $t_{(sx,sy)}$ is used to represent the texture coordinate of a vertex with surface coordinate (sx,sy). In addition to a texture coordinate, a color can also be assigned to each vertex. The color of a triangle is then interpolated smoothly across the triangle between the colors of each of its vertices. This coloring is usually multiplied with the colors of the mapped image to produce the overall visual appearance of the triangle. The mapping of an image onto a triangle using textures coordinates and the blending of colors across a triangle is supported by most 3D graphics APIs, such as OpenGL and Microsoft Direct 3D.

A general method for generating visually interesting mappings of images and colors onto a surface will now be described. These mappings are time-varying and the nature of the time variations is controlled by an animation signal derived from an audio input. (A technique for defining and detecting events and applying deformation in response thereto is set forth in the commonly assigned, co-pending application Ser. No. 09/373,405, filed Aug. 12, 1999, entitled "Audio Driven Visual Representations," which is hereby incorporated by reference for all purposes.) The mapping is updated at discrete time intervals, indexed by the variable n. Consider a set of K vertices, where each vertex k has surface coordinate $S_k$ (vector notation). The texture coordinate of vertex k at time interval n is computed as:

$$t_k[n]=b(s_k,n)M(s_k,n)+(1-b(s_k,n))t_k[n-1], \quad (1)$$

where $M(s_k,n)$ is a time-varying function which maps surface coordinates to texture coordinates, and $b(s_k,n)$ is a time-varying blending function that lies between 0 and 1. At the extremes, if $b(s_k,n)$ is equal to one, then $t_k[n]$ is set equal to the texture coordinate generated by the mapping function. If $b(s_k,n)$ is equal to zero, then $t_k[n]$ is set equal to the texture coordinate from the previous iteration. The color at vertex k is similarly updated as:

$$c_k[n]=b(s_k,n)C(s_k,n)+(1-b(s_k,n))c_k[n-1], \quad (2)$$

where $C(s_k,n)$ is a time-varying function which generates a color based on surface coordinates. Equations (1) and (2) are iterated over a finite control interval of time defined by each animation control signal that is generated. Since several animation control signals can coexist, several instances of (1) and (2) may be operating simultaneously.

Figure 2:
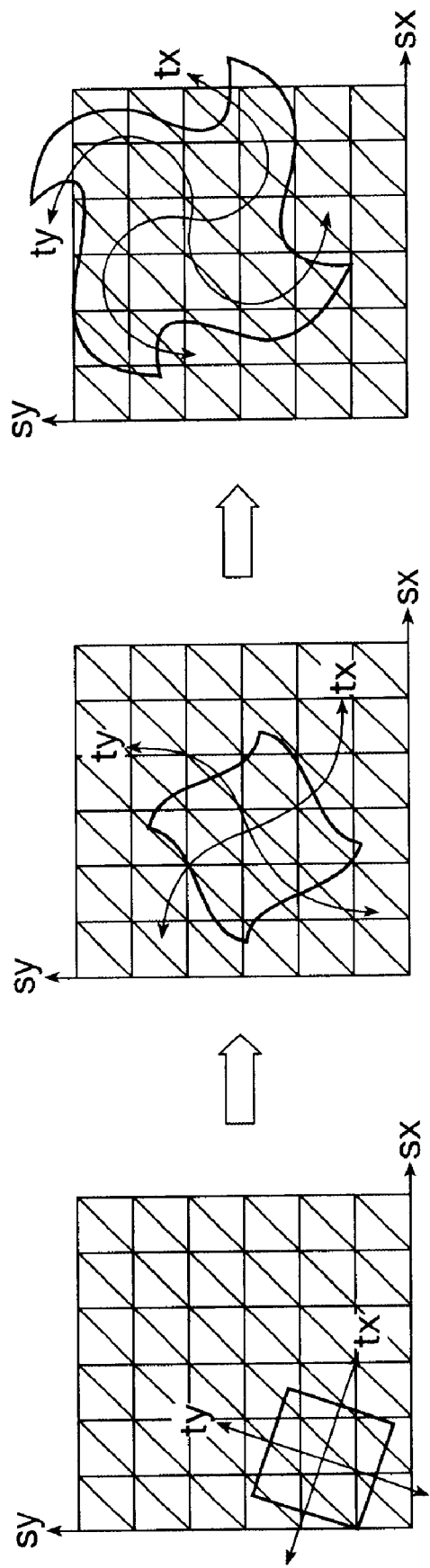
FIG. 2 is a group of graphs depicting the displacement and distortion of a series of remapped textures.
Figure 3:
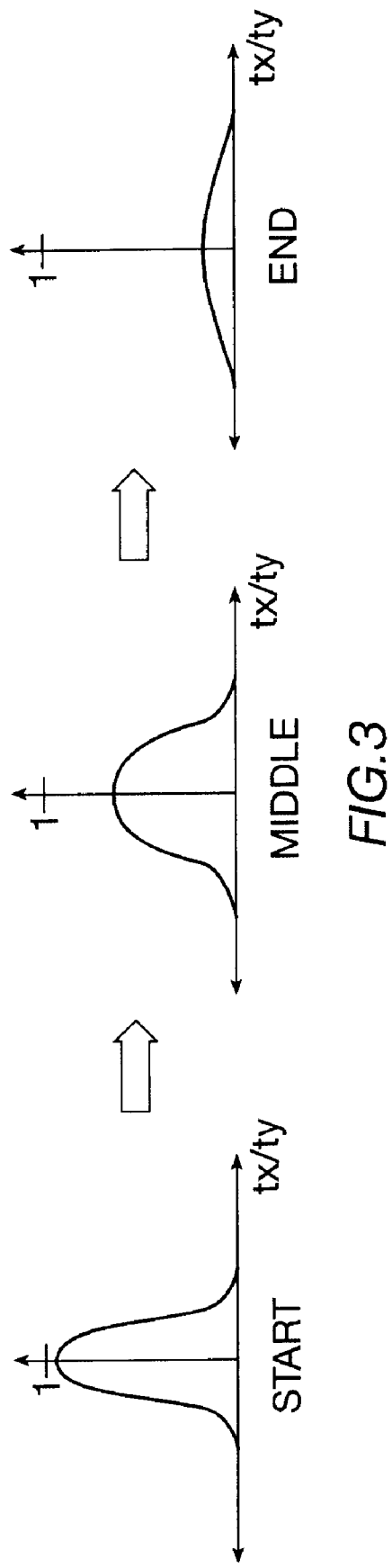
FIG. 3 is a group of graphs of a blending function at different times during a control interval.

An infinite variety of visual effects can be achieved by choosing different functions $M(s_k,n)$, $C(s_k,n)$, and $b(s_k,n)$. FIG. 2 depicts the results of one combination of $M(s_k,n)$ and $b(s_k,n)$ utilized in the preferred embodiment. FIG. 2 displays snapshots of deformations of an image caused by the functions $M(s_k,n)$ and $b(s_k,n)$ corresponding to the start, middle, and end of an animation control interval. FIG. 3 displays the shape of the blending function at corresponding times. As time progresses, FIG. 2 depicts how the texture coordinate mapping moves across the surface, grows, and spirals. At the same time, FIG. 3 depicts how the blending function widens symmetrically from the origin of the texture coordinates and decreases from one down to zero. The visual result is a smoothly blended copy of the image moving across the surface, growing, and spiraly in on itself. Numerous other functions are utilized in the preferred embodiment. For example, the blending function $b(s_k,n)$ may ripple symmetrically from the origin of the texture coordinates, yielding a visual distortion of the image similar to ripples on the surface of water. Also, for each animation control signal, the parameters governing the exact behavior of the functions $M(s_k,n)$, $C(s_k,n)$, and $b(s_k,n)$ may be randomized in order to introduce visual variety. For example, in the case of FIG. 2, the spiral velocity may be chosen randomly between some preset range of values.

The described time-varying mappings leave a distorted version of the texture image on the surface. It may be desired, however, to return to a default mapping of the image on the surface after the distortions are applied. This is achieved by applying a restoring force to the texture coordinate of each vertex at every iteration before any instance of (1) and (2) is computed. A modified texture coordinate is computed according to $$t_k[n]=\alpha t_k[n-1]+(1-\alpha)\hat{t}_k, \quad (3)$$

where $\hat{t}_k$ is the texture coordinate corresponding to the default mapping and α is a number between 0 and 1. The term $t_k[n-1]$ in (1) and (2) is then replaced by $\hat{t}_k[n]$. The time it takes to restore back to the default mapping is controlled by the parameter α. At the extremes, if α is equal to one, the default mapping is never reached, while if α is equal to zero, the default mapping is reached immediately.

In a preferred embodiment, the technique is implemented by a digital computer, executing software stored in a computer readable medium, to display graphics on a computer monitor.

Extensions to the described technique include mapping more than one image onto a surface at a time. Through a technique called multi-texturing, several images may be simultaneously blended on a surface. In such a case, each vertex possesses a different texture coordinate for each image. With the use of multi-texturing, different instances of the described algorithm can be simultaneously applied to different images, all of which are combined on the same surface. Also, the image which is used for a particular mapping need not be static. With each time interval n, the image can change. For example, the images may be updated from a pre-recorded or a live video stream. Additionally, the events which trigger the changes in the images can be extracted from the video stream itself as described in the above referenced patent application.

Accordingly, although the invention has been described with reference to the preferred embodiments, it is not intended to limit the invention except as provided by the appended claims.

What is claimed is:

1. A method for deforming computer generated graphic images comprising the acts of:

forming a mapped image by mapping distinct sets of texture coordinates to a plurality of vertices existing in the virtual 3D image environment, with each set of texture coordinates describing a specific point of an image that is to be mapped to a surface defined by the vertices;

monitoring an external signal to detect triggering events;

generating an animation control signal when a triggering event is detected, with an animation control signal having a duration equal to a control interval;

remapping different sets of texture coordinates to said vertices at discrete time intervals during said control interval to animate the appearance of said mapped image on said surface; and blending newly mapped texture coordinates mapped at different time intervals with the current vertex texture coordinates to smoothly animate the mapped image.

2. The method of claim 1 further comprising the steps of:

mapping distinct colors to said vertices;

smoothly interpolating mapped colors on the surface between vertices;

remapping different sets of distinct colors to said vertices at discrete time intervals during said control interval to animate said mapped colors on said surface; and blending sets of newly mapped colors mapped at different time intervals with the current vertex colors to smoothly animate the colors.

3. The method of claim 1 where said act of remapping comprises the acts of:

translating and spiraling the mapped image on the surface.

4. The method of claim 1 further comprising the act of:

utilizing a video stream as the image to be mapped.

5. The method of claim 1 further comprising a method of restoring a remapped image to a restored configuration, further comprising the acts of:

restoring remapped texture coordinates to a default configuration to said vertices at discrete time intervals to change said remapped image on said surface to a default configuration; and blending the default texture coordinates with the remapped texture coordinates to smoothly animate the remapped image from a modified configuration to the default configuration.

6. The method of claim 1 further comprising the acts of:

randomizing the remapping and blending of the texture coordinates.

7. The method of claim 1 where said act of blending further comprises the acts of:

providing a blending function which ripples symmetrically from the origin of the texture coordinates.

8. A computer program product comprising:

a computer readable storage structure embodying program code thereon, said program code comprising:

program code for causing a computer to form a mapped image by mapping distinct sets of texture coordinates to a plurality of vertices existing in the virtual 3D image environment, with each set of texture coordinates describing a specific point of an image that is to be mapped to a surface defined by the vertices;

program code for causing a computer to monitor an external signal to detect triggering events;

program code for causing a computer to generate an animation control signal when a triggering event is detected, with an animation control signal having a duration equal to a control interval;

program code for causing a computer to remap different sets of texture coordinates to said vertices at discrete time intervals during said control interval to animate the appearance of said mapped image on said surface; and program code for causing a computer to blend newly mapped texture coordinates at different time intervals with current vertex texture coordinates to smoothly animate the mapped image.

9. A method for animating computer generated images comprising the acts of:

forming a mapped image by mapping distinct sets of texture coordinates to a plurality of vertices existing in the virtual 3D image environment, with each set of texture coordinates describing a specific point of an image that is to be mapped to a surface defined by the vertices;

monitoring an external signal to detect triggering events;

generating an animation control signal when a triggering event is detected, with an animation control signal having a duration equal to a control interval;

mapping distinct colors to said vertices;

smoothly interpolating mapped colors on the surface between vertices;

remapping different sets of distinct colors to said vertices at discrete time intervals during said control interval to animate said mapped colors on said surface; and blending sets of newly mapped colors mapped at different time intervals with the current vertex colors to smoothly animate the colors.

* * * * *